United States Patent
Fischler et al.

(10) Patent No.: US 7,702,239 B2
(45) Date of Patent: Apr. 20, 2010

(54) CROSS-CONNECTOR FOR OPTICAL SIGNALS

(75) Inventors: Wolfgang Fischler, München (DE); Nancy Hecker, München (DE); Alexander Richter, München (DE); Wolfgang Schairer, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 738 days.

(21) Appl. No.: 10/508,731

(22) PCT Filed: Mar. 12, 2003

(86) PCT No.: PCT/DE03/00795

§ 371 (c)(1),
(2), (4) Date: May 17, 2005

(87) PCT Pub. No.: WO03/081824

PCT Pub. Date: Oct. 2, 2003

(65) Prior Publication Data

US 2008/0019692 A1    Jan. 24, 2008

(30) Foreign Application Priority Data

Mar. 21, 2002 (DE) ............... 102 12 649

(51) Int. Cl.
*H04J 14/00* (2006.01)
(52) U.S. Cl. .............. 398/50; 398/45; 398/65; 398/56; 398/48

(58) Field of Classification Search ........... 398/65, 398/45, 56, 50, 48, 49, 154
See application file for complete search history.

(56) References Cited

U.S. PATENT DOCUMENTS

| | | | | |
|---|---|---|---|---|
| 5,086,349 A | * | 2/1992 | Okayama et al. | 398/48 |
| 5,357,359 A | * | 10/1994 | Uchiyama et al. | 398/75 |
| 5,457,556 A | * | 10/1995 | Shiragaki | 398/50 |
| 5,754,321 A | * | 5/1998 | Giles et al. | 398/83 |
| 5,805,320 A | * | 9/1998 | Kuroyanagi et al. | 398/56 |
| 6,154,583 A | * | 11/2000 | Kuroyanagi et al. | 385/16 |
| 6,154,587 A | * | 11/2000 | Okayama | 385/24 |
| 6,459,826 B1 | * | 10/2002 | Boivin et al. | 385/11 |
| 6,579,018 B1 | * | 6/2003 | Li et al. | 398/4 |
| 6,792,207 B2 | * | 9/2004 | Iannone et al. | 398/51 |
| 6,937,822 B2 | * | 8/2005 | Noirie et al. | 398/45 |
| 7,254,327 B1 | * | 8/2007 | Zhong et al. | 398/33 |
| 2005/0270979 A1 | * | 12/2005 | Pauluhn et al. | 370/238 |

FOREIGN PATENT DOCUMENTS

| | | |
|---|---|---|
| EP | 1 137 308 A2 | 9/2001 |
| EP | 1 162 855 A1 | 12/2001 |

* cited by examiner

*Primary Examiner*—Ken N Vanderpuye
*Assistant Examiner*—Hibret A Woldekidan
(74) *Attorney, Agent, or Firm*—Dickinson Wright PLLC

(57) ABSTRACT

A cross connector for the transparent switching of optical signals is disclosed, comprising a first switching module with one or several switching modules of varying granularity, such as patch panel, wavelength groups or/and wavelengths. A second switching device is connected in series with the first switching device and comprises a polarization multiplex switching granularity.

17 Claims, 3 Drawing Sheets

| SV | SV1 | SV2 | SV3 |
|---|---|---|---|
| SV1 | F | | |
| | GW | | |
| | W | | |
| SV1 + SV2 | GW | F | |
| | W | F | |
| | W | GW | |
| SV1 + SV2 + SV3 | W | GW | F |

CROSS-CONNECTOR FOR OPTICAL SIGNALS

CROSS REFERENCE TO RELATED APPLICATIONS

This application is the US National Stage of International Application No. PCT/DE03/00795, filed Mar. 12, 2003 and claims the benefit thereof. The International Application claims the benefits of German application No. 10212649.6 filed Mar. 21, 2002, both of the applications are incorporated by reference herein in their entirety.

FIELD OF INVENTION

The invention relates to a cross-connector for optical signals.

BACKGROUND OF INVENTION

With regard to WDM networks, in future there will be fully optical (also referred to as photonic), transparent domains. In order to increase the transmission capacity of the individual channels of a WDM or DWDM signal (dense wavelength division multiplexing) it is possible to employ the polarization multiplex technique in such a network. Two differently polarized optical signals whose directions of polarization are normally orthogonal can be transmitted on one wavelength of a channel. Add/drop modules or optical cross-connectors are currently used for the through-connection, addition and/or feeding out of channels in a network element connected to the optical network. These known network elements are simply capable of selectively switching different wavelengths as their smallest granularity. Thus, when using these network elements in the case of optical networks with polarization multiplex, two signals which are situated on one wavelength are always switched.

In addition to wavelength granularity, current add/drop modules can also switch wavelength group granularity. This means that for example a plurality of channels from the optical network with separate wavelengths are coupled instead of a single channel. The wavelength-selective switching takes place in an additional switching device which is connected to that used for wavelength group switching.

The normal cross-connectors have the same wavelength granularity and wavelength group granularity as the add/drop modules and also the patch panel granularity which is based on a switching of all or a plurality of channels or of one channel of a WDM signal from one fiber of the optical network to another fiber.

A cross-connector having a first switching device for patch panel switching (fiber routing switch FR) of signals is described in EP 1 162 855 A1, whose inputs and outputs are linked to outputs and inputs respectively of a second switching device for wavelength switching (wavelength routing switch WR) of channels of a WDM signal. This cross-connector is not however suitable for switching polarized signal components of a polarization multiplexed signal.

A polarization multiplex switch is known from EP 1 137 308 A2, to whose input one channel with two orthogonal polarization states is fed. A regulated polarization controller regulates the two polarization states of the channel in such a way that two signals having orthogonal directions of polarization are separated by a polarization beam splitter. The regulation of the polarization controller is used in order to optimize the mapping of the two directions of polarization of the outgoing signal from the polarization controller on the separating characteristics of the polarization beam splitter. This polarization demultiplexer forms a drop switching of one of the two orthogonal linearly polarized signals. In addition, the remaining second orthogonal linearly polarized signal passes through a polarization beam coupler tuned to its direction of polarization where it is combined with a new external signal. The new external signal exhibits a direction of polarization which is orthogonal to the direction of polarization of the signal from the polarization beam splitter.

A switch is also described here in which a WDM signal is fed into a wavelength demultiplexer in order to separate its channels. Some channels are fed into a plurality of add/drop modules and other channels are fed into polarization switches. This switch is therefore not optimally suited in the case of a dynamic optical network having a variable number of channels and/or having variable transmission properties for the channels such as polarization and/or wavelength multiplex because a further item of information from each incoming new channel would be required in order to perform appropriate switching.

SUMMARY OF INVENTION

The object of the invention is thus to specify a cross-connector which allows channels of a WDM signal transmitted as desired with or without polarization multiplex to be switched. In addition, the cross-connector should be fully optically and transparently suitable for an optical dynamic network, whereby a switching should be possible in accordance with one or some to all granularities: patch panel, wavelength group, wavelength and polarization.

According to the invention this object is achieved by the claims.

Advantageous developments of the invention are described in the dependent claims.

On the basis of an optical cross-connector having a first switching device for the through-connection, branching and/or feeding in of optical signals in an optical network, according to the invention a second switching device for polarization multiplex signals is assigned to the first switching device, the inputs and outputs of the second switching device being connected to the outputs and inputs respectively of the first switching device, and the second switching device has at least one polarization demultiplexer and at least one polarization multiplexer with external connection points.

The granularity of the first switching device is based on patch panel or/and wavelength group or/and wavelength through cascaded connection of switching modules which have at least one of these granularities.

It is particularly advantageous that an optical signal such as a WDM signal for example is routed transparently from one switching module to another switching module and can be switched in accordance with any desired granularity. After passing through one or several or all switching modules, a channel is fed into the second switching device or so-called polarization multiplex switch and, when polarization multiplex is in use, is split up into two orthogonally polarized signals which are output to an external terminal, for example.

If the number of channels or the properties of the channels such as wavelength and/or polarization multiplex change as in the case of dynamic networks, the cross-connector according to the invention exhibits a high level of flexibility as a result of its universal switching capabilities and also a low network management resource requirement for the channel switching operations.

In addition, the cross-connector exhibits bidirectional and transparent transmission or switching as a result of its structural symmetry. The switching arrangement can also be used in respect of signals other than polarization multiplex signals.

Embodiments of the invention will be described with reference to the drawings. In the drawings:

DETAILED DESCRIPTION OF INVENTION

Figure 1:
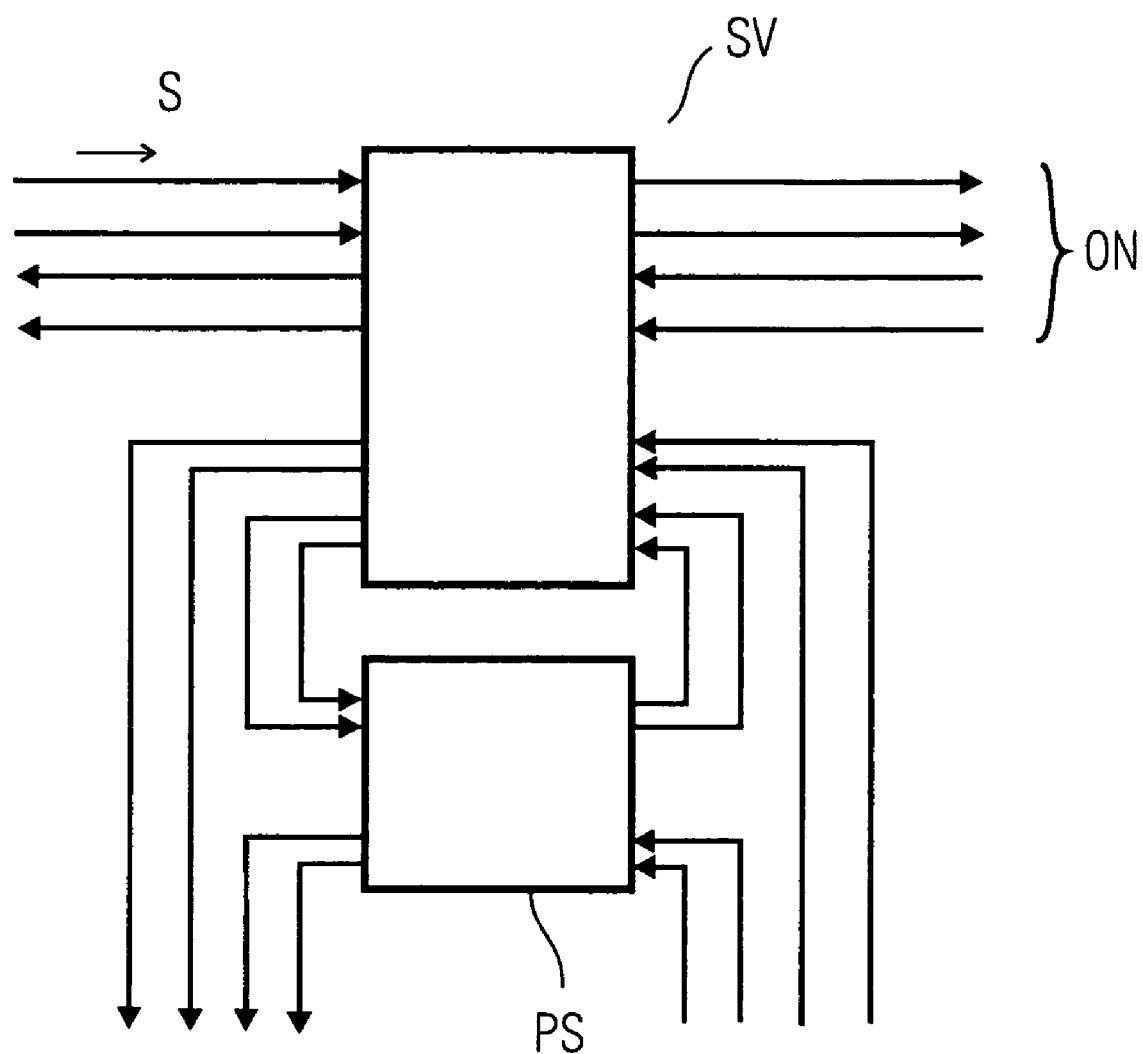
FIG. 1 shows a cross-connector according to the invention having at least two granularities.

FIG. 1 shows a schematic diagram of a cross-connector according to the invention having at least two granularities which are defined by means of a first switching device SV and by means of a polarization multiplex switch as a second switching device PS. One or more optical signals S are transmitted unidirectionally or bidirectionally by way of an optical network ON whose optical fibers are connected to the first switching device SV. One or more outputs from the first switching device SV are connected to corresponding inputs of the second switching device PS. In the case of a polarization multiplex signal at the input to the second switching device PS, it is possible to couple out both signals of the polarization multiplex signal or to couple out only one signal from the polarization multiplex signal and to through-connect the other signal back to the first switching device SV or to through-connect both signals of the polarization multiplex signal back to the first switching device SV. In the case of signals at the output of the first switching device which have been branched off from the optical network ON and are not polarization multiplex signals, the first switching device SV enables a drop switching to the outside in accordance with its granularity. The granularity provided for the first switching device SV is the wavelength, a group of wavelengths or a patch panel between the different fibers of the optical network ON. The first switching device SV can have one or more switching modules arranged in cascaded fashion with different granularities for the through-connection, branching or/and feeding in of channel signals from the optical signals S. The sequence of the granularities is chosen such that the transmission or the switching of the optical signals S into the cascaded switching modules is performed transparently and with a switching hierarchy of patch panel—wavelength group—individual wavelength up to the second switching device PS.

Further Add switching facilities are also provided on both switching devices SV, PS, which can feed channel signals for example from an external terminal into the optical network ON for their transmission.

Figure 2:
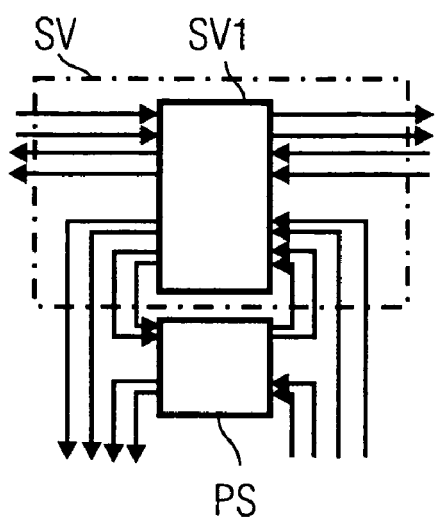
FIG. 2 shows a cross-connector according to the invention having two granularities.

FIG. 2 shows a cross-connector according to the invention having two granularities according to FIG. 1 which are defined by a first switching device SV with a first switching module SV1 and by a polarization switch as a second switching device PS. The switching module SV1 has a granularity which generates a patch panel switching, a wavelength group switching or a wavelength switching. In order to separate or combine channel signals of the optical signals S, demultiplexers or multiplexers are located in one of the two or between the two switching elements SV1, PS if required for example for WDM signals.

Figure 3:
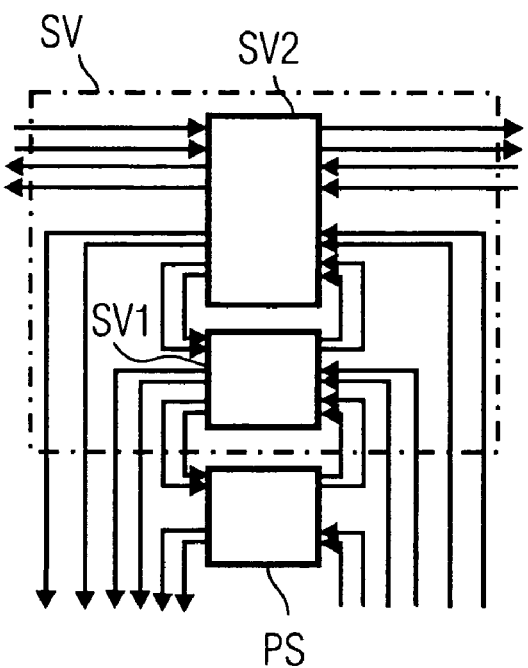
FIG. 3 shows a cross-connector according to the invention having three granularities.

FIG. 3 shows a cross-connector according to the invention having three granularities according to FIG. 1 or 2, whereby a second switching module SV2 having a granularity different from the granularity of the switching module SV1 is inserted between the switching module SV1 and the optical network ON. Three different variants of granularity combinations are possible for the cascaded switching modules SV1, SV2:

The first switching module SV1 has a wavelength group granularity and the second switching module SV2 has a patch panel granularity.

The first switching module SV1 has a wavelength granularity and the second switching module SV2 has a patch panel granularity.

The first switching module SV1 has a wavelength granularity and the second switching module SV2 has a wavelength group granularity.

The last variant for cascading the switching modules SV1, SV2 is known on the basis of the prior art as an optical add/drop module "OADM" with regard to WDM transmission systems. As a result of the inventive connection with the second switching device PS as a polarization multiplex switch, the polarization granularity is also present.

In this case also, demultiplexers and multiplexers are located between or in the switching elements SV1, SV2, PS if required for the separation of the optical signals S into channel signals or for the combination of the channel signals into one or more optical signals S.

Figure 4:
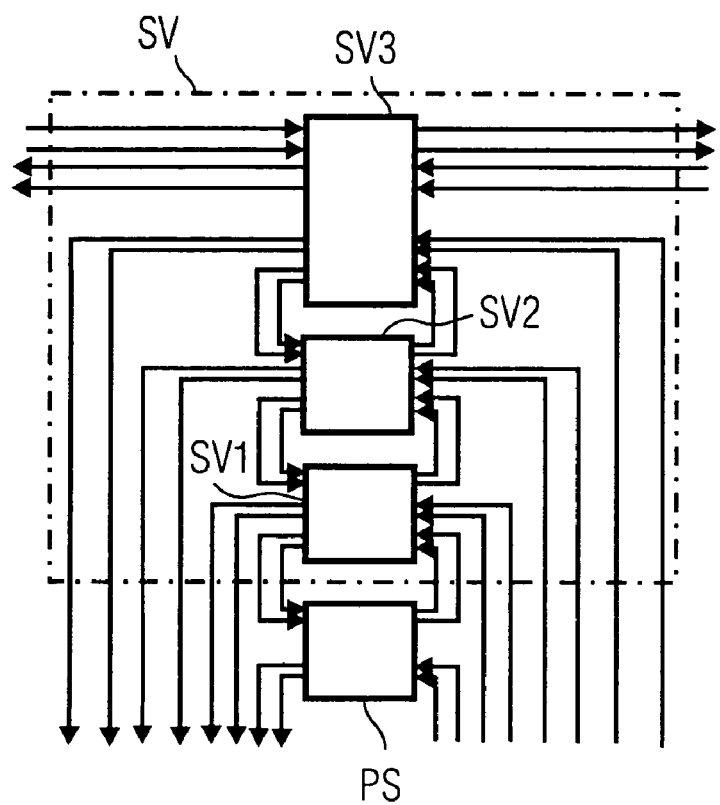
FIG. 4 shows a cross-connector according to the invention having four granularities.

FIG. 4 shows a cross-connector according to the invention having four granularities according to FIGS. 1 to 3, whereby the first switching device SV has three cascaded switching modules SV1, SV2, SV3 with the respective granularities: patch panel, wavelength group and wavelength. On the basis of the prior art, the first switching device SV is known as an optical cross-connector "OXC". As a result of the inventive connection with the second switching device PS as a polarization multiplex switch, the polarization granularity is also present.

Figures 5, 6:
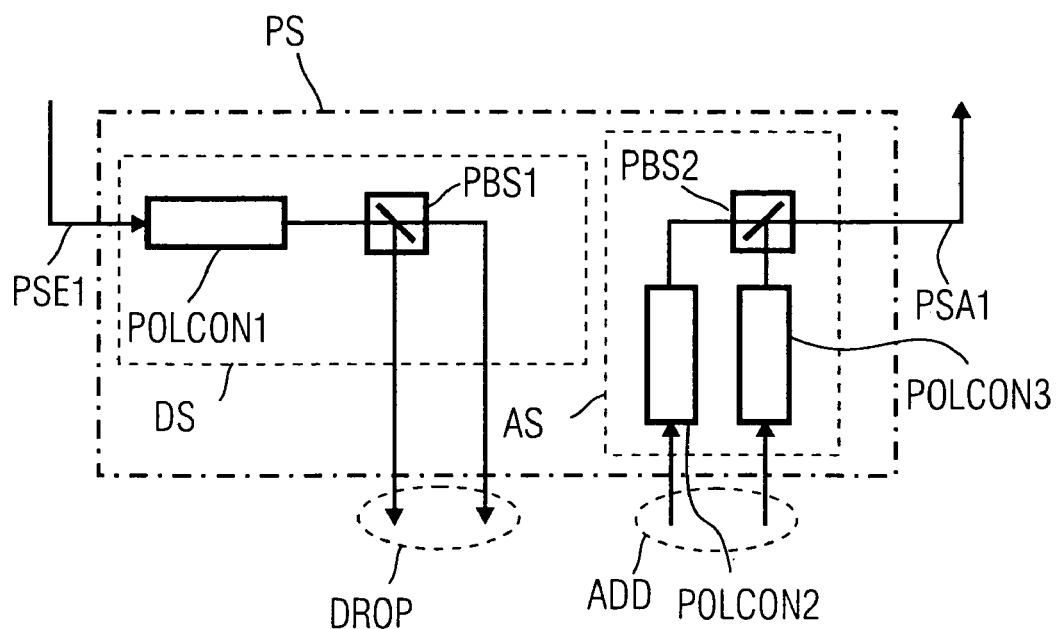
FIG. 5 shows a table giving the groupings of the granularities according to the number of switching modules used.
FIG. 6 shows a polarization multiplex switch according to the invention.

FIG. 5 shows a table giving the groupings of the granularities according to the number of switching modules SV1, SV2, SV3 used in the first switching device SV according to FIGS. 1 to 4. The different switching options are identified as switching W of individual channel signals or as switching GW of groups of channel signals or as switching F of the optical signals S between different fibers of the optical network ON. It is assumed here that the second switching device PS is connected downstream of the first switching module SV1 as a polarization multiplex switch. The identifiers SV1, SV1+SV2 and SV1+SV2+SV3 correspond to the different cascaded configurations of the switching modules SV1, SV2, SV3 according to FIGS. 2 to 4.

FIG. 6 shows a polarization multiplex switch according to the invention which is used as a second switching device according to FIGS. 1 to 4.

A polarization multiplex signal having two data channels from the first switching device SV or from a demultiplexer is fed by way of an input PSE1 into a polarization demultiplexer DS with one polarization controller POLCON1. The polarization controller POLCON1 aligns the inbound polarization multiplex signal in such a way that the directions of polarization of both data channels are adjusted to the separating characteristics of a downstream polarization beam splitter PBS1 in order to effect their separation. The outbound signals from the polarization beam splitter PBS1 form the Drop signals at the output DROP of the polarization multiplex switch PS. Under certain circumstances, for example if the transmission path suffers from PDL (polarization dependent loss), two polarization controllers and two polarization beam splitters or filters are required in order to allow separation of the two polarization signals.

Two signal channels for example from an external terminal are fed into a polarization multiplexer AS at further inputs ADD on the polarization multiplex switch PS. The polarization multiplexer AS has two polarization controllers POL-CON2, POLCON3 into each of which is fed one of the two channel signals, which is output with orthogonal polarization settings. The polarization settings are defined such that the two channel signals are combined in a downstream polarization coupler PBS2 to produce a polarization multiplex signal which is routed to an output PSA1 of the polarization multiplexer AS or of the polarization multiplex switch PS. The polarization multiplex signal generated can then be delivered to the first switching device SV and transmitted onward by the switching modules SV1, SV2, SV3.

As a general principle, all other polarization multiplex switches operating on the basis of the prior art can also be used as a second switching device PS.

For bidirectional polarization switching of a channel signal, according to FIG. 6 two polarization multiplex switches are located in the second switching device PS which in each case are provided for unidirectional operation.

If the transmission path suffers from PDL (polarization dependent loss) or other characteristics are present which can cancel the orthogonality of the two polarization multiplex signals, the polarization demultiplexer DS has two polarization controllers and two polarization beam splitters, only one output from which is used in each case. One alternative is also to use two polarization filters instead of the polarization beam splitters. A 3 dB coupler connected upstream or another suitable optical component for signal division splits the polarization multiplex signal to the two polarization controllers.

Signals having any granularities can in particular be switched as optical signals S using the cross-connector according to FIG. 4. Signals or channel signals which are not available as polarization multiplex signals or are unpolarized can also be switched transparently by the first switching device SV. This is because of the cascading of the switching elements PS, SV1, SV2, SV3 which results in a high level of switching universality for the cross-connector according to the invention.

A network management facility controls the appropriate switching of the cross-connector according to the invention depending on the required and possible granularity for each optical signal.

The invention claimed is:

1. An optical cross-connector, comprising:
   a first switching device for at least one of through-connection, branching and feeding in of optical signals in an optical network, the first switching device having granularities comprising at least one of a patch panel, wavelength group and wavelength;
   first connection points operatively coupling the first switching device to the optical network;
   a second switching device operatively coupled in a cascaded arrangement to the first switching device to allow communication of polarization multiplex signals, the second switching device including a polarization demultiplexer and a polarization multiplexer, wherein at least one of (i) a first external output of the polarization demultiplexer and (ii) a first external input of the polarization multiplexer are operatively coupled with at least one external second connection point, and the second switching device having a granularity comprising a polarization;
   third connection points operatively coupling the first switching device to a second switching device, a second switching device input operatively coupled to a first switching device output, and a second switching device output operatively coupled to a first switching device input; and
   at least one external fourth connection point operatively coupling the first switching device to at least one of a second external input and a second external output, the second external input and the second external output being separate from the optical network and the second switching device.

2. The optical cross-connector according to claim 1, wherein the optical signals are provided as WDM signals with channel signals having at least one of different wavelengths and different polarization settings than polarization multiplex signals.

3. The optical cross-connector according to claim 2, wherein wavelength demultiplexers and wavelength multiplexers are located in at least one of the first switching device, the second switching device, and between the first switching device and second switching device, for at least one of separating channel signals and combining channel signals.

4. The optical cross-connector according to claim 1, wherein the first switching device comprises a first switching module for at least one of switching individual channel signals, switching groups of channel signals, and switching the optical signals between different fibers of the optical network, and wherein at least one of (i) the second switching device input is operatively coupled to a first switching module output and (ii) the second switching device output is operatively coupled to a first switching module input.

5. The optical cross-connector according to claim 2, wherein the first switching device comprises a first switching module for at least one of switching individual channel signals, switching groups of channel signals, and switching the optical signals between different fibers of the optical network, and wherein the second switching device input is operatively coupled to a first switching module output and the second switching device output is operatively coupled to a first switching module input.

6. The optical cross-connector according to claim 3, wherein the first switching device comprises a first switching module for at least one of switching individual channel signals, switching groups of channel signals, and switching the optical signals between different fibers of the optical network, and wherein the second switching device input is operatively coupled to a first switching module output and the second switching device output is operatively coupled to a first switching module input.

7. The optical cross-connector according to claim 1, wherein
   the first switching device comprises a first switching module and a second switching module, wherein the first switching module and second switching module causing at least one of:
   a first switching of individual channel signals and a second switching of groups of channel signals of the optical signals and
   a first switching of groups of channel signals of the optical signals and a second switching of the optical signals between different fibers of the optical network and a first switching of individual channel signals and a second switching of the optical signals between different fibers of the optical network, wherein the second switching device input is operatively coupled to a first switching module output and the second switching device output is operatively coupled to a first switching module input, and wherein the first switching module input is operatively coupled to a second switching module output, and the first switching module output is operatively coupled to a second switching module input.

8. The optical cross-connector according to claim 1, wherein the first switching device comprises a first switching module for switching individual channel signals, a second switching module for switching groups of channel signals of the optical signals, and a third switching module for switching the optical signals between different fibers of the optical network, wherein the second switching device input is operatively coupled to a first switching module output and the second switching device output is operatively coupled to a first switching module input, wherein the first switching module input is operatively coupled to a second switching module output, and the first switching module output is operatively coupled to a second switching module input, and wherein the second switching module input is operatively coupled to a third switching module output, and the second switching module output is operatively coupled to a third switching module input.

9. The optical cross-connector according to claim 1, wherein fifth connection points operatively couple a first switching module to a second switching module.

10. The optical cross-connector according to claim 1, wherein the polarization demultiplexer and the polarization multiplexer are provided as at least one of a Drop switching facility and an Add switching facility respectively for at least one channel signal, the polarization demultiplexer having a polarization controller and a polarization beam splitter, and the polarization multiplexer having a polarization controller and a polarization coupler.

11. The optical cross-connector according to claim 1, wherein at an input of the polarization demultiplexer, a polarization multiplex signal is fed into a polarization controller to map its polarized signal component into two differently polarized signal channels which after passing through a polarization beam splitter, the output of which is the first external output.

12. The optical cross-connector according to claim 1, wherein at an input of the polarization demultiplexer, a polarization multiplex signal is fed into two polarization controllers with at least one of a 3dB coupler connected upstream and another optical component for signal division to map the two differently polarized signal components of the polarization multiplex signal in each case onto the separating characteristic of at least one of a polarization beam splitter and a polarization filter, the output of which is the first external output.

13. The optical cross-connector according to claim 1, wherein at an input of the polarization multiplexer, two polarized signal channels having the same wavelengths are in each case fed into a polarization controller to map their polarization into two differently polarized signal components which after passing through a polarization coupler form a polarization multiplex signal at the second switching device output operatively coupled to the first switching device input.

14. The optical cross-connector according to claim 10, wherein the polarization controllers have at least one linear direction of polarization at their output which is mapped onto one of the polarization characteristics of at least one of the polarization beam splitter and the polarization coupler connected downstream.

15. The optical cross-connector according to claim 1, wherein at least one of the optical signals comprises a polarization multiplex signal.

16. The optical cross-connector according to claim 1, wherein the optical signals are at least one of through-connected, branched and fed in bidirectionally.

17. The optical cross-connector according to claim 1, wherein at least one optical signal is bidirectionally transmitted via the optical network and the first switching device and the second switching device.

* * * * *